US00RE45680E

(19) United States
(12) Reissued Patent
Nouvel

(10) Patent Number: US RE45,680 E
(45) Date of Reissued Patent: Sep. 29, 2015

(54) TRANSVERSELY RETAINED MULTIPLE SLIP-JOINT PLIERS

(75) Inventor: Claude Nouvel, Vitry sur Seine (FR)

(73) Assignee: STANLEY WORKS (EUROPE) GMBH, Dubendorf (DE)

(21) Appl. No.: 11/785,758

(22) Filed: Apr. 19, 2007

Related U.S. Patent Documents

Reissue of:

(64) Patent No.: 6,880,434
Issued: Apr. 19, 2005
Appl. No.: 10/332,848
PCT Filed: Jul. 6, 2001
PCT No.: PCT/FR01/02193
§ 371 (c)(1),
(2), (4) Date: Jan. 14, 2003
PCT Pub. No.: WO02/06012
PCT Pub. Date: Jan. 24, 2002

(30) Foreign Application Priority Data

Jul. 19, 2000 (FR) ..... 00 09495

(51) Int. Cl.
*B25B 7/04* (2006.01)
*B25B 7/10* (2006.01)

(52) U.S. Cl.
CPC ..... *B25B 7/10* (2013.01)

(58) Field of Classification Search
USPC ..... 81/406–416, 391–395, 385, 386, 81/352–360, 467, 347
See application file for complete search history.

(56) References Cited

U.S. PATENT DOCUMENTS

| | | | | | |
|---|---|---|---|---|---|
| RE4,917 | E | * | 5/1872 | Herbert | 81/409 |
| 228,333 | A | * | 6/1880 | Fawcett | 81/406 |
| 707,418 | A | * | 8/1902 | Howland | 81/353 |
| 2,882,775 | A | | 4/1959 | Rank et al. | |
| 4,748,876 | A | * | 6/1988 | Solf et al. | 81/385 |
| 5,752,419 | A | * | 5/1998 | Liou | 81/416 |
| 6,019,020 | A | | 2/2000 | Liou | |
| 6,318,217 | B1 | * | 11/2001 | Emhardt et al. | 81/411 |
| 7,255,027 | B1 | * | 8/2007 | Tsai | 81/408 |
| 7,293,485 | B2 | * | 11/2007 | Engvall et al. | 81/413 |

FOREIGN PATENT DOCUMENTS

| | | |
|---|---|---|
| DE | 195 18 555 | 11/1996 |
| DE | 299 20 171 | 2/2000 |

* cited by examiner

*Primary Examiner* — Hadi Shakeri
(74) *Attorney, Agent, or Firm* — Pillsbury Winthrop Shaw Pittman LLP

(57) ABSTRACT

A multiple joint pliers having a transversely retaining branch (2), a transversely retained branch (3), and a plate (4). The transversely retaining branch (2) which includes a first jaw (6), a first articulating intermediate zone (9) and a first handle (10). The first articulating zone defines a recess (12), and on either side thereof, a stepped portion (14). The transversely retained branch (3) includes a second jaw (21), a second articulating intermediate zone (23) and a second handle (22). The second articulating zone being received mobile in rotation, and selectively in translation, in the recess. The plate (4) maintaining the second articulating zone in the recess. The ends (27) of the plate are positioned on the respective stepped portions. The plate (4) is generally Ω-shaped when viewed laterally.

16 Claims, 3 Drawing Sheets

TRANSVERSELY RETAINED MULTIPLE SLIP-JOINT PLIERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

The present invention relates to interengaged multigrip pliers.

Multigrip pliers of this type (see for example DE-A-195 18 555, U.S. Pat. No. 6,019,020) make it possible to provide interengaged guiding, which is therefore precise and reliable, with two arms produced by cold forging and a plate attached to the interengaging arm.

However, in the aforementioned known solutions the planar shape of the plate leads to a substantial thickness of the interengaging arm and to a corresponding substantial thickness of the other arm.

SUMMARY OF THE INVENTION

The object of the invention is to thin down the arms of the pliers. To this end the invention relates to interengaged multigrip pliers of the aforementioned type, characterised in that the plate has a generally Ω shape when viewed from the side.

BRIEF DESCRIPTION OF THE DRAWINGS

An embodiment of the invention will now be described with reference to the accompanying drawings, in which.

DETAILED DESCRIPTION OF THE INVENTION

Figure 1:
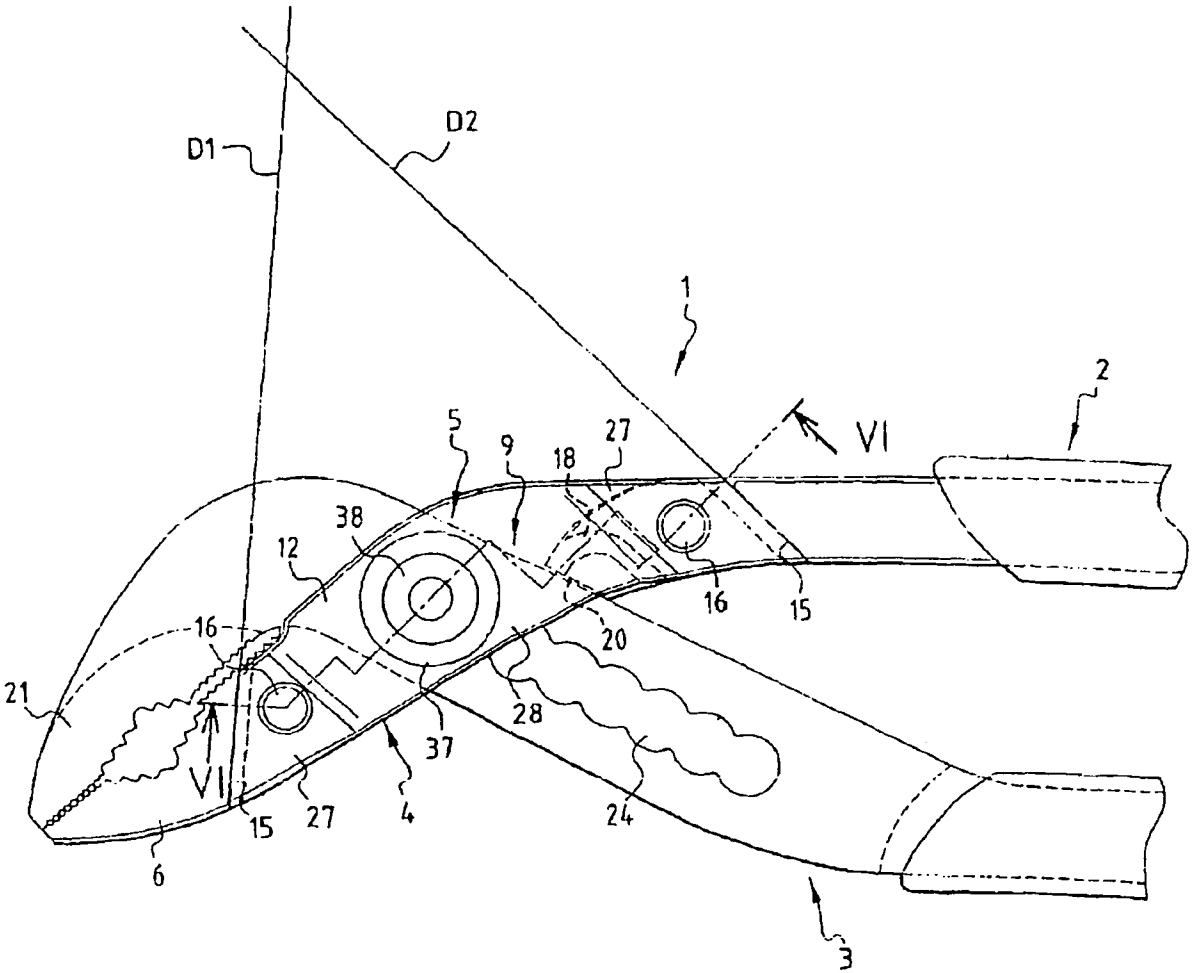
FIG. 1 shows a partial view in elevation of multigrip pliers constructed according to the invention.
Figure 2:
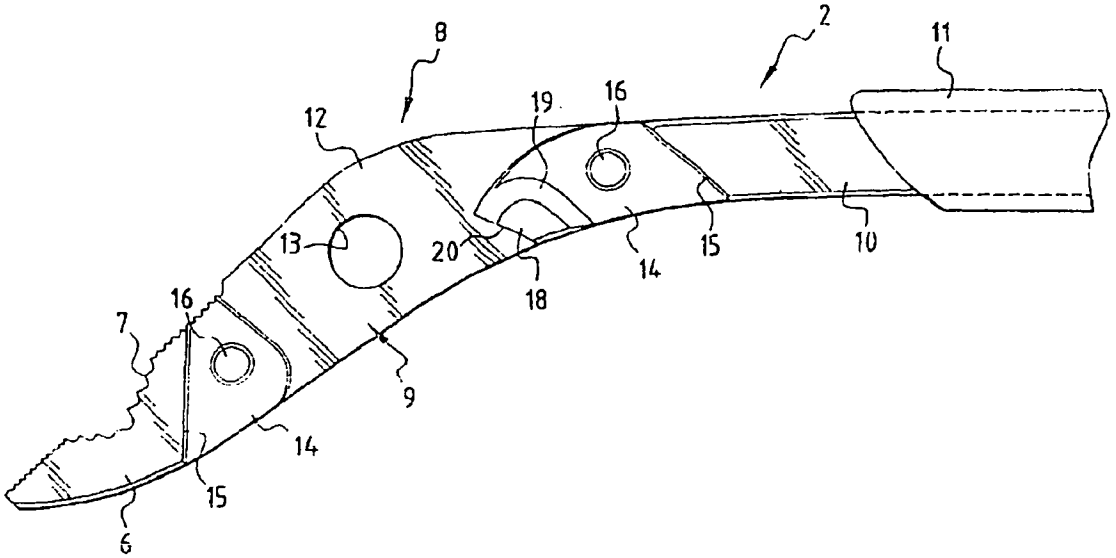
FIG. 2 shows a partial view in elevation of the interengaging arm of the pliers shown in FIG. 1.
Figure 3:
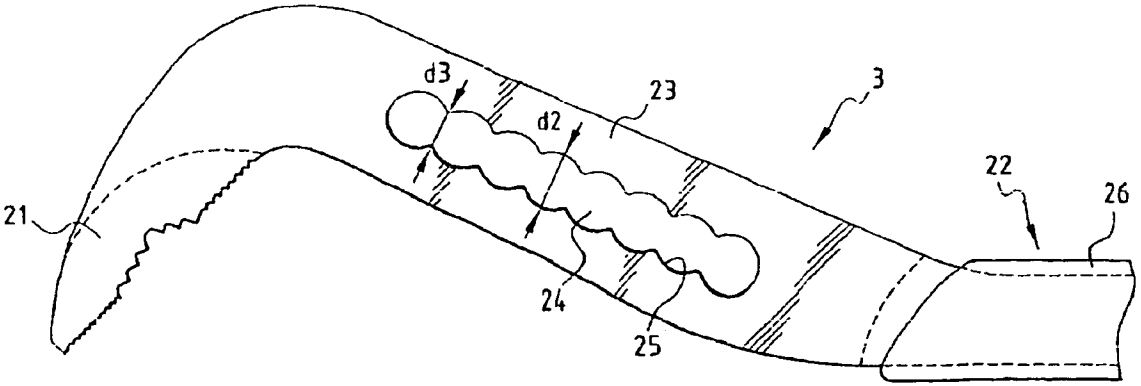
FIG. 3 shows a partial view in elevation of the interengaged arm of the pliers shown in FIG. 1.
Figure 4:
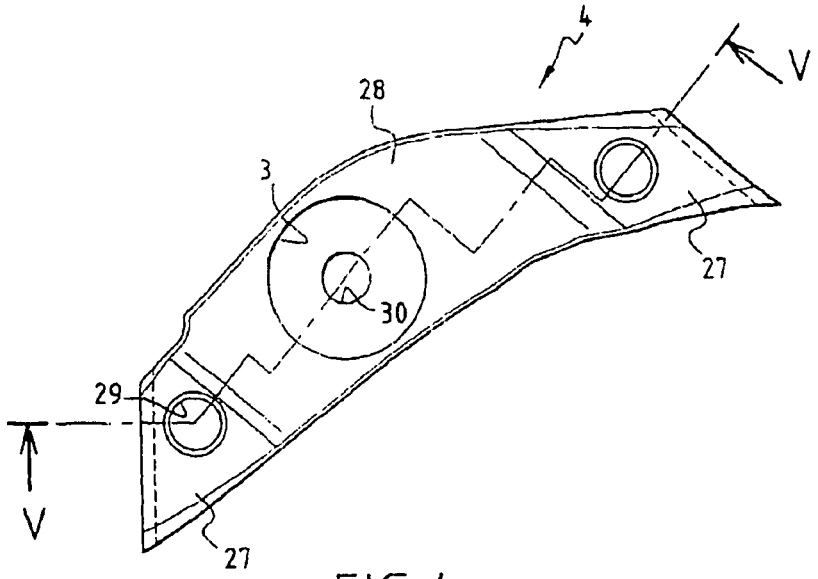
FIG. 4 shows a view in elevation of the plate.
Figure 5:
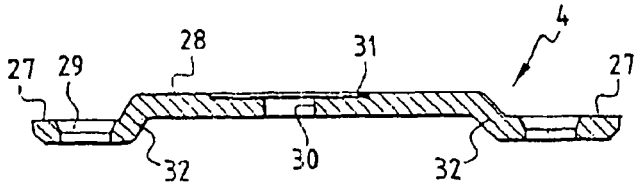
FIG. 5 shows a sectional view along the broken line V-V in FIG. 4.
Figure 6:
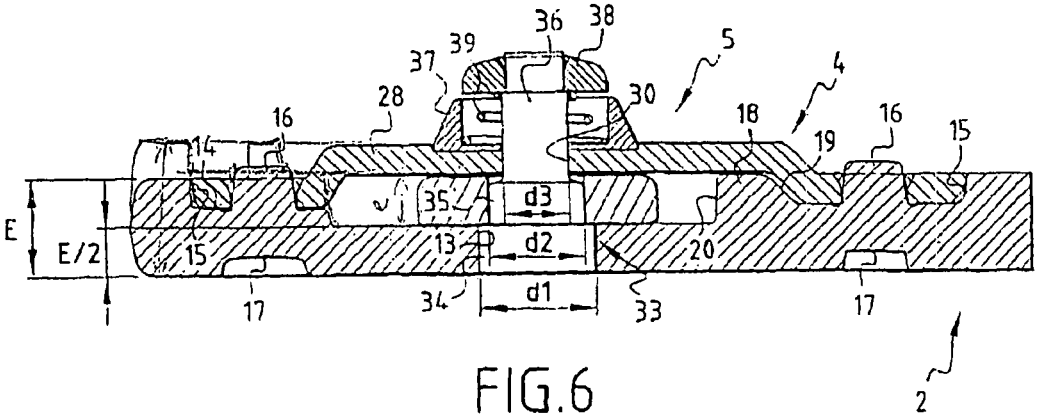
FIG. 6 shows a sectional view of the pliers along the broken line VI-VI in FIG. 1.

The multigrip pliers 1, which are shown assembled in FIGS. 1 and 6 and assumed to be placed flat on a horizontal surface, consist of an interengaging arm 2 which is made in one piece by cold forging and is shown in FIG. 2, an interengaged arm 3 which is likewise made in one piece by cold forging and is shown in FIG. 3, a plate 4 shown in FIGS. 4 and 5, and a device 5 for controlling the opening of the jaws which can be seen in FIG. 6.

The arm 2 has at its distal or front end a first jaw 6 which has an appropriate gripping serration 7. It also has, starting from this jaw, an intermediate region 8 in which a recess 9 is formed, then a rear or proximal part 10 which forms a handle. The part 10 may be covered in the usual way with a sleeve 11 made from plastic or elastomeric material.

The jaw 6 and the part 10 have the same thickness E (FIG. 6) and have a generally rectilinear shape, whilst the region 8 has a reduced thickness and, in elevation (FIG. 2), has a generally bent shape of which the concavity is turned downwards in the drawings.

The recess 9 (FIGS. 2 and 6) consists of a central depression 12 with a flat base of which the depth is E/2 and of which the base has a circular opening of diameter $d_1$. This depression 12 is bounded at each longitudinal end by a flat step 14 with a height of approximately E/4. As can be seen in FIG. 2, the steps are limited at their external ends by respective shoulders 15 which converge sharply towards one another towards the back of the pliers, that is to say upwards in FIG. 1. In the illustrated example the straight lines D1 and D2, which correspond to these shoulders, form an angle of approximately 50°. The lines D1 and D2 extend along the respective shoulders 15.

A stud 16 substantially in the shape of a truncated cone which is produced by cold forging projects from each step 14. In a corresponding manner, a recess 17 is formed under each stud. Moreover, a projection 18 is provided on the internal edge of the proximal step 14. This projection has a proximal face 19 inclined at approximately 45° and a distal face 20 which is substantially vertical, which also delimits the part 12 of the depression.

The external surface of the arm 2, namely its lower surface in the position illustrated, is planar with the exception of the two recesses 17.

The arm 3 also has an external surface (its upper surface in the illustrated position) which is planar. It has a thickness E in its front or distal region which defines its jaw 21, as well as in its rear region 22 which forms the handle. In its intermediate articulation region 23, the thickness of the arm 3 is E/2. This region 23 is substantially rectilinear in elevation (FIG. 3) and has an elongate cut-out 24 with a plurality of circular notches 25 of diameter $d_2$ which is less than $d_1$, and these circular notches interpenetrate as is usual in multigrip pliers. The minimum width of the cut-out 24, between the notches 25, is $d_3<d_2$. The handle 22 is covered with a sleeve 26 similar to the sleeve 11.

Viewed in elevation according to FIGS. 1 and 4, the plate 4 has the contour of the recess 9 of the arm 22 from one shoulder 15 to the other. In longitudinal section FIG. 5), it has a Ω shape, that is to say that its two end parts 27 which are planar and are applied flat to the respective steps 14 are located in a plane which is offset downwards with respect to its central part 28 which is likewise planar. Each part 27 is pierced by a circular opening 29 which widens towards the top, whilst the part 28 is pierced by circular opening of diameter$d_3$, bounded at the top by a circular dish 31 which is not very deep. The inclination of the connecting zones 32 between the parts 27 and 28 is the same as that of the edge 19 of the projection 18.

The control device 5 consists of a stepped pin 33 having a lower part 34 of diameter $d_1$, an intermediate part 35 of diameter $d_2$, an upper part 36 of diameter $d_3$ and an end part of smaller diameter. The pin 33 passes upwards from below through the opening 13, the cut-out 24 and the opening 30. A cap 37 is positioned in the dish 31, a washer 38 is riveted on the upper end of the pin 33, and a helical spring 39 in the shape of a truncated cone is compressed between this washer and the base of the dish 37.

In order to assemble the pliers, the arm 2 is placed on a horizontal support with the recess 9 turned upwards, then the part 34 of the pin 33 is inserted into the opening 13. Then the arm 3 is put on with its planar face turned upwards and its intermediate region 23 placed on the base of the part 12 of the recess 9, a notch 25 slipping onto the part 35 of the pin.

Next the plate 4 is put onto the assembly in such a way that the part 36 of the pin 33 passes through the opening 30 and each stud 16 passes through an opening 29. The cap 37 and the spring 39 are put in position, then the washer 38 is fixed by riveting on the upper end of the pin 33. Finally the two studs 16 are riveted over in the openings 29.

In order to adjust the opening of the jaws 6 and 21, the washer 38 is pressed until it is concealed in the cap 37 against the spring 39. Then the part 36 of the pin 33 is located in the cut-out 34, which makes it possible to displace the pin along this cut-out. When the washer 38 is released, the spring 39 returns the part 35 into a notch 25 of the cut-out 24, which defines a fixed articulation point of the pliers (FIG. 6).

As can be seen clearly in FIG. 6, by virtue of the Ω-shaped cross-section of the plate 4 the thickness of the arms 2 and 3 can be limited to E, that is to say double the thickness of the intermediate articulation zones 8 and 23 of the two arms.

Moreover, irrespective of the adjustment which is chosen, the handles of the two arms come closer only to a limited extent so as to prevent the user's fingers from being pinched. The stop is provided, for the front notch 25, by the contact of the two jaws and, for the other notches, by the contact of the back of the region 23 with the front edge 20 of the projection 18. What is more, as a variant this projection can also limit the closing of the pliers for the front notch 25.

It should be noted that the substantially vertical orientation of the edge 20 means that even if the user forces the tool towards closure, this does not result in any tendency of the plate 4 to be expelled upwards.

If after a certain period of use the studs 16 become loose or are deformed by shear, the plate comes into abutment, during locking, on the convergent shoulders 15, which limits the deformation of the elements of the pliers and ensures that the plate is held in place.

What is claimed is:

1. Interengaged multigrip pliers comprising:

an interengaging arm having a first jaw, a first intermediate articulation region, and a first handle, the first intermediate articulation region defining a depression, and a step on either side of the depression;

an interengaged arm having a second jaw, a second intermediate articulation region, and a second handle, the second articulation region being received so as to be movable in rotation, and selectively in translation, in the depression; and a plate for holding the second articulation region in the depression, ends of the plate being positioned on the steps, respectively, wherein*:* the plate has an outer generally Ω shape when viewed from a side thereof*;*

*the second intermediate articulation region has an elongate cut-out;*

*the pliers further comprise a pin attached to the plate and the first intermediate articulation region; and*

*the pin has a portion thereof extending through the elongate cut-out in the second intermediate articulation region so that the second articulation region is movable in rotation, and selectively in translation, in the depression.*

2. The interengaged multigrip pliers as claimed in claim 1, wherein the plate includes a planar central part and two end parts, which are planar and are located in a plane that is offset with respect to the planar central part.

3. The interengaged multigrip pliers as claimed in claim 1, wherein the planar central part is connected to each end part by an inclined connecting zone.

4. The interengaged multigrip pliers as claimed in claim 1, wherein the interengaging arm includes a projection disposed in a proximal end of the depression, and a back portion of the interengaged arm abuts against the projection when the pliers are closed in a longitudinal position thereof.

5. The interengaged multigrip pliers as claimed in claim 4, wherein a stop face of the projection is substantially perpendicular to a base of the depression.

6. The interengaged multigrip pliers as claimed in claim 1, wherein the plate is positioned by two studs, which are integrally forged with the interengaging arm, so as to project from the steps and penetrate into respective openings of the plate.

7. The interengaged multigrip pliers as claimed in claim 6, wherein each stud is riveted in its respective opening.

8. The interengaged multigrip pliers as claimed in claim 1, wherein the steps are delimited externally by two respective shoulders which converge towards a back of the pliers, the plate having at its longitudinal ends a shape matching the two shoulders.

9. The interengaged multigrip pliers as claimed in claim 1, wherein the outer generally Ω of the plate is defined by two planar end parts, a planar central part, and inclined connecting portions between the planar end parts and the planar central part.

10. Interengaged multigrip pliers comprising:

an interengaging arm having a first jaw, a first intermediate articulation region, and a first handle, the first intermediate articulation region defining a depression, and a step on either side of the depression;

an interengaged arm having a second jaw, a second intermediate articulation region, and a second handle, the second articulation region being received so as to be movable in rotation, and selectively in translation, in the depression; and a plate for holding the second articulation region in the depression, ends of the plate being positioned on the steps, respectively, wherein the plate has an outer generally Ω shape when viewed from a side thereof, [and]

wherein the second articulation region of the interengaged arm is also received in the hollow portion of the plate, which is defined between the ends of the plate, so as to be movable in rotation and selectively in translation*, and*

*wherein:*

*the second intermediate articulation region has an elongate cut-out;*

*the pliers further comprise a pin attached to the plate and the first intermediate articulation region; and*

*the pin has a portion thereof extending through the elongate cut-out in the second intermediate articulation region so that the second articulation region is movable in rotation, and selectively in translation, in the depression.*

*11. Interengaged multigrip pliers comprising:*

*a first interengaging arm having a first jaw, a first intermediate articulation region, and a first handle, the first intermediate articulation region defining a depression;*

*a second interengaged arm having a second jaw, a second intermediate articulation region, and a second handle, the second intermediate articulation region having an elongate cut-out and being received so as to be movable in rotation, and selectively in translation, in the depression; and*

*a plate that holds the second intermediate articulation region in the depression, wherein opposite end portions of the plate and are attached to the first interengaging arm, wherein the plate has an outer generally Ω shape when viewed from a side thereof;*

*wherein a central portion of the plate comprises a recess that receives a portion of the second intermediate articulated region, wherein the recess defines a space located between a first plane along which the central portion is disposed and a second plane along which at least one of the end portions is disposed such that a portion of the second intermediate articulation region is disposed in the space between the first plane and the second plane, and wherein the central portion has an opening therein; and*

*a pin having a portion thereof extending into the opening in the central portion and through the elongate cut-out in the second intermediate articulation region.*

*12. The interengaged multigrip pliers according to claim 11, further comprising notches along the second intermediate articulation region to enable the first intermediate articulation region to be selectively locked at different locations relative to the second intermediate articulation region.*

*13. The interengaged multigrip pliers according to claim 12, further comprising a spring that biases the pin in a locking direction.*

*14. The interengaged multigrip pliers according to claim 13, wherein an enlarged head portion of the pin can be depressed against the bias of the spring to release locking engagement of the selected notch.*

*15. The interengaged multigrip pliers according to claim 11, wherein the plate has openings therethrough at the end portions thereof, and wherein the openings facilitate attachment of the end portions to the first interengaging arm.*

*16. The interengaged multigrip pliers according to claim 11, wherein a combined thickness of the first intermediate articulation region and the second intermediate articulation region is approximately equal to a thickest portion of one of the arms.*

* * * * *